(12) United States Patent
Pan

(10) Patent No.: US 8,274,663 B2
(45) Date of Patent: Sep. 25, 2012

(54) THICKNESS DETECTING MECHANISM

(75) Inventor: Yung-Tai Pan, Taipei (TW)

(73) Assignee: Primax Electronics Ltd., Taipei (TW)

(*) Notice: Subject to any disclaimer, the term of this patent is extended or adjusted under 35 U.S.C. 154(b) by 357 days.

(21) Appl. No.: 12/560,202

(22) Filed: Sep. 15, 2009

(65) Prior Publication Data

US 2010/0328683 A1 Dec. 30, 2010

(30) Foreign Application Priority Data

Jun. 26, 2009 (TW) .............................. 98121556 A

(51) Int. Cl.
*G01B 11/28* (2006.01)
*B65H 33/04* (2006.01)

(52) U.S. Cl. ........ 356/630; 356/614; 271/263; 156/378; 270/52.15; 270/58.03

(58) Field of Classification Search .......... 356/614–623, 356/630–632; 250/559.27, 225, 229, 559.29
See application file for complete search history.

(56) References Cited

U.S. PATENT DOCUMENTS

| | | | |
|---|---|---|---|
| 6,459,492 B1* | 10/2002 | Hercher ........................ 356/622 |
| 6,747,745 B2* | 6/2004 | Ishikawa et al. ............. 356/614 |
| 6,765,195 B1* | 7/2004 | Leviton ..................... 250/231.13 |
| 6,788,875 B1* | 9/2004 | Bidiville et al. .............. 385/147 |
| 6,903,358 B2* | 6/2005 | Kim .......................... 250/559.27 |
| 7,573,586 B1* | 8/2009 | Boyer et al. .................. 356/630 |
| 7,850,160 B2* | 12/2010 | Kato et al. ................. 270/58.09 |
| 2002/0159074 A1* | 10/2002 | Kawachi et al. .............. 356/616 |
| 2004/0189593 A1* | 9/2004 | Koay ............................ 345/156 |
| 2009/0200498 A1* | 8/2009 | Rudolphi .................. 250/559.27 |
| 2011/0148025 A1* | 6/2011 | Pan et al. .................... 271/10.01 |
| 2011/0156337 A1* | 6/2011 | Pan et al. ........................ 271/4.1 |

FOREIGN PATENT DOCUMENTS

| JP | 63-16250 | * | 1/1988 |
| JP | 408202920 | * | 8/1996 |

* cited by examiner

*Primary Examiner* — Hoa Pham
(74) *Attorney, Agent, or Firm* — Kirton McConkie; Evan R. Witt

(57) ABSTRACT

A thickness detecting mechanism is provided for detecting a thickness of a to-be-measured article. The thickness detecting mechanism includes a detecting arm and an optical displacement sensing module. The detecting arm is moved as the to-be-measured article is sustained against the detecting arm. The detecting arm includes a surface. The optical displacement sensing module detects the surface of the detecting arm when the detecting arm is respectively located in a first position and a second position. According to the displacement amount of the detecting arm from the first position to the second position, the thickness of the to-be-measured article is acquired.

15 Claims, 6 Drawing Sheets

THICKNESS DETECTING MECHANISM

FIELD OF THE INVENTION

The present invention relates to a thickness detecting mechanism, and more particularly to a thickness detecting mechanism for use in an electronic device.

BACKGROUND OF THE INVENTION

A thickness detecting mechanism is usually used for measuring the thickness of a paper or a sheet-like article. According to the thickness measured by the thickness detecting mechanism, the further operation will be adjusted. Generally, the thickness detecting mechanism is applied to an electronic device for expanding the function of the electronic device or achieving other functions.

For example, the thickness detecting mechanism could be mounted in a paper shredder. By the paper shredder, a paper is cut into strips or fine particles in order to protect the confidential information of the paper from being stolen. Conventionally, the paper shredder comprises a shredding path, a shredding knife assembly and a thickness detecting mechanism. The shredding knife assembly is disposed at the outlet of the shredding path for cutting the paper that is exited from the shredding path. The thickness detecting mechanism is disposed beside the shredding path for detecting the paper that is transported through the shredding path.

During operation of the paper shredder, the thickness detecting mechanism could discriminate whether the paper introduced into the paper shredder is beyond an acceptable limit of the paper shredder by detecting the thickness of the paper.

In a case that the thickness of the paper is not beyond the acceptable limit, the operation of the paper shredder is continuously done. Whereas, in a case that the thickness of the paper is beyond the acceptable limit, the operation of the paper shredder is interrupted or the paper is withdrawn from the paper shredder in order to prevent from damage of the paper shredder. Various thickness detecting mechanisms applicable to the conventional paper shredder have been disclosed in for example US Patent Publication No. US2006/0219827A1, and the contents of which are hereby incorporated by reference.

In addition, the thickness detecting mechanism could be applied to a sheet laminating apparatus. The sheet laminating apparatus is used for laminating a valuable sheet-like article between two pieces of protective films in order to achieve the protective purpose. Conventionally, the sheet laminating apparatus comprises a transfer passage, a heat-treating member, a laminating member and a thickness detecting mechanism. The sheet-like article could be transported through the transfer passage. The thickness detecting mechanism is disposed beside the transfer passage. The laminating member is arranged at the distal end of the transfer passage. The laminating member is enclosed by the heat-treating member for converting electrical energy into heat energy. The heat energy is transmitted to the laminating member to heat up the sheet-like article, and the sheet-like article is pressed by the laminating member.

As known, the performance of the sheet laminating apparatus is influenced by the thickness detecting mechanism, because the thickness of the sheet-like article is highly dependent on the working temperature of the heat-treating member and the rotating speed of the laminating member. Generally, as the thickness of the sheet-like article is increased, the heat energy required by the sheet laminating apparatus is increased. That is, the working temperature of the heat-treating member is increased. In addition, the rotating speed of the laminating member needs to be reduced in order to increase the residence time of the sheet-like article in the sheet laminating apparatus and absorb much heat energy. On the other hand, as the thickness of the sheet-like article is decreased, the working temperature of the heat-treating member is decreased and/or the rotating speed of the laminating member is increased. In other words, the thickness detecting mechanism is required for operating the sheet laminating apparatus. According to the thickness of the sheet-like article measured by the thickness detecting mechanism, the working temperature of the heat-treating member and the rotating speed of the laminating member are dynamically controlled.

From the above discussion, it is found that the thickness detecting mechanism is very important for many electronic devices. Since the conventional thickness detecting mechanism has complicated mechanical configurations, the fabricating cost thereof is very high. In addition, since there are too many components included in the conventional thickness detecting mechanism, the assembling process thereof is complicated. In other words, the conventional thickness detecting mechanism is not cost-effective.

Therefore, there is a need of providing a cost-effective thickness detecting mechanism so as to obviate the drawbacks encountered from the prior art.

SUMMARY OF THE INVENTION

It is an object of the present invention to provide a thickness detecting mechanism having a benefit of cost-effectiveness.

Another object of the present invention provides a thickness detecting mechanism for detecting the thickness of a to-be-measured article by using an optical sensing element.

In accordance with an aspect of the present invention, there is provided a thickness detecting mechanism for detecting a thickness of a to-be-measured article that is introduced into an electronic device. The thickness detecting mechanism includes a detecting arm and an optical displacement sensing module. The detecting arm is moved as the to-be-measured article introduced into the electronic device is sustained against the detecting arm. The detecting arm is located in a first position before the to-be-measured article is sustained against the detecting arm. The detecting arm is located in a second position when the to-be-measured article is sustained against the detecting arm. The optical displacement sensing module is disposed at a side of the detecting arm for detecting a displacement amount of the detecting arm from the first position to the second position, thereby acquiring the thickness of the to-be-measured article.

In an embodiment, the detecting arm has a surface disposed at the side thereof.

In an embodiment, the optical displacement sensing module includes a circuit board, a light source, an optical assembly, a sensor and a control unit. The light source is disposed on the circuit board for emitting a light beams. The optical assembly is used for guiding the light beams to be projected on the surface of the detecting arm. The sensor is disposed on the circuit board for receiving the light beams reflected from the surface and generating corresponding image signals according to the reflected light beams. A first image signal is obtained by the sensor when the detecting arm is located in the first position. A second image signal is obtained by the sensor when the detecting arm is located in the second position. The control unit is disposed on the circuit board for calculating the displacement amount between the first position and the second position according to the first image signal and the second image signal.

In an embodiment, the optical displacement sensing module further includes a fixing cover, which is disposed on the circuit board for fixing the light source and the sensor on the circuit board.

In an embodiment, the optical assembly includes a first optical lens and a second optical lens. The first optical lens is arranged in front of the light source for focusing the light beams emitted by the light source and projecting the focused light beams on the surface of the detecting arm. The second optical lens is used for receiving the light beams reflected from the surface of the detecting arm and focusing the light beams.

In an embodiment, the optical assembly further includes a reflective mirror set for changing the direction of the light beams, so that the light beams are projected on the surface of the detecting arm.

In an embodiment, the reflective mirror set includes a first reflective mirror and a second reflective mirror. The light beams emitted by the light source pass through the first optical lens, is reflected from the first reflective mirror and the second reflective mirror, and is projected on the surface of the detecting arm. The light beams reflected from the surface of the detecting arm pass through the second optical lens and is projected on the sensor to be received by the sensor.

In an embodiment, the first optical lens and the second optical lens are convex lenses.

In an embodiment, the first optical lens, the second optical lens, the first reflective mirror and the second reflective mirror of the optical assembly are integrally formed.

In an embodiment, the light source is a light emitting diode (LED) or a laser diode.

In an embodiment, the control unit is a digital signal processor (DSP).

In an embodiment, the thickness detecting mechanism further includes a case for sheltering the thickness detecting mechanism.

In an embodiment, the thickness detecting mechanism further includes a spring. An end of the spring is connected with the case. The other end of the spring is connected with the detecting arm. After the to-be-measured article is transported across the detecting arm and no longer sustained against the detecting arm, an elastic force of the spring is offered to return the detecting arm from the second position to the first position.

In an embodiment, the case further includes a supporting part, which is sustained against another side of the detecting arm for preventing from rocking of the detecting arm during movement of the detecting arm.

In an embodiment, the case further includes a gliding slot, and the gliding slot has a gliding slot bottom.

In an embodiment, the detecting arm further includes a protrusion disposed at another side of the detecting arm and inserted into the gliding slot. The protrusion is supported on the gliding slot bottom when the detecting arm is located in the first position. The detecting arm is moved and the protrusion is moved in the gliding slot when the to-be-measured article is introduced into the thickness detecting mechanism and sustained against the detecting arm.

In an embodiment, after the to-be-measured article is transported across the detecting arm and no longer sustained against the detecting arm, the detecting arm is returned to the first position, and the protrusion is returned to the gliding slot bottom and supported on the gliding slot bottom.

In an embodiment, the detecting arm further includes a roller, which is disposed at an end of the detecting arm and contacted with the to-be-measured article for facilitating movement of the to-be-measured article.

In an embodiment, the electronic device is a paper shredder, and the to-be-measured article is a paper.

In an embodiment, the electronic device is a sheet laminating apparatus, and the to-be-measured article is a sheet-like article.

In an embodiment, the electronic device is a scanning apparatus, and the to-be-measured article is a paper.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
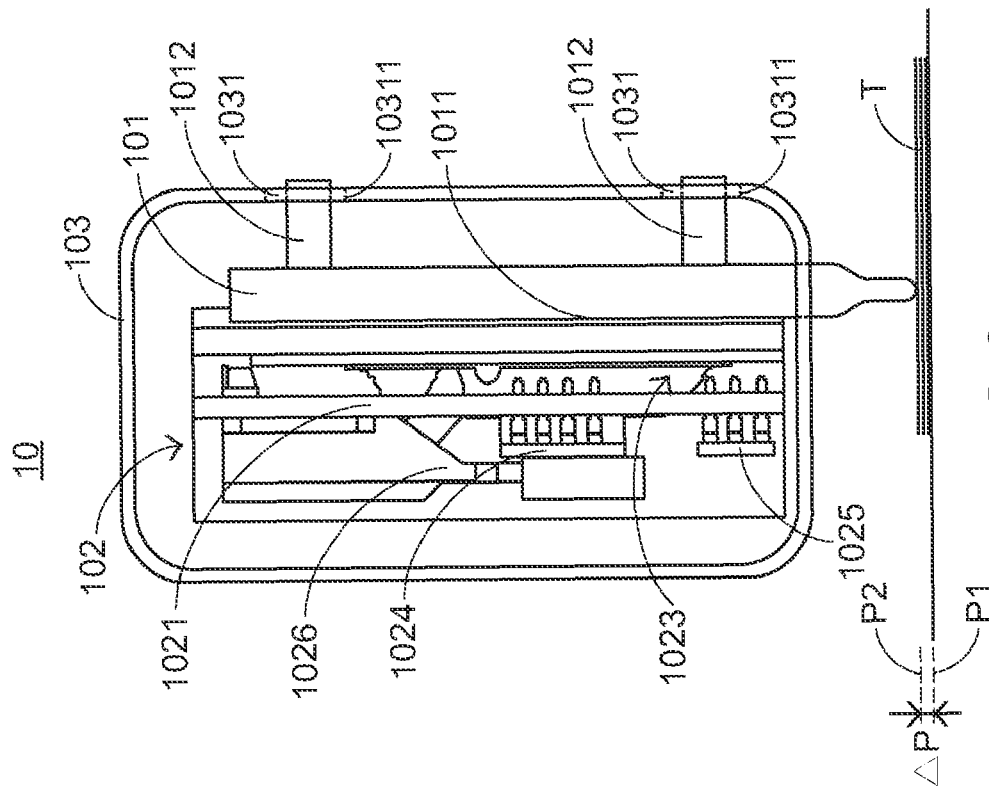
FIG. 1 is a schematic view illustrating a thickness detecting mechanism according to a first embodiment of the present invention.

FIG. 1 is a schematic view illustrating a thickness detecting mechanism according to a first embodiment of the present invention. The thickness detecting mechanism 10 is used for detecting a to-be-measured article T (see FIG. 2). In this embodiment, the thickness detecting mechanism 10 comprises a detecting arm 101, an optical displacement sensing module 102 and a case 103. The case 103 is used for sheltering the components of the thickness detecting mechanism 10. The case 103 comprises a gliding slot 1031. The gliding slot 1031 has a gliding slot bottom 10311. When the to-be-measured article T is introduced into the thickness detecting mechanism 10, the to-be-measured article T is sustained against the detecting arm 101 such that the detecting arm 101 is moved. The detecting arm 101 has a surface 1011 and a protrusion 1012. The surface 1011 is arranged at a side of the detecting arm 101. The protrusion 1012 is arranged at another side of the detecting arm 101 and inserted into the gliding slot 1031. The optical displacement sensing module 102 is disposed beside the detecting arm 101 for detecting the displacement amount of the detecting arm 101, thereby acquiring the thickness of the to-be-measured article T.

Please refer to FIG. 1 again. In a case that the detecting arm 101 is located in a first position P1 where the to-be-measured article T is not sustained against the detecting arm 101, the protrusion 1012 of the detecting arm 101 is disposed and supported on the gliding slot bottom 10311 of the gliding slot 1031. The optical displacement sensing module 102 comprises a circuit board 1021, a light source 1022 (see FIG. 3), an optical assembly 1023, a sensor 1024, a control unit 1025 and a fixing cover 1026. The light source 1022 is disposed on the circuit board 1021 for emitting light beams B (see FIG. 3). In this embodiment, the light source 1022 is a light emitting diode (LED). Alternatively, another example of the light source 1022 is a laser diode for emitting laser beams. The optical assembly 1023 is used for guiding the light beams B and focusing the light beams B. The sensor 1024 is also disposed on the circuit board 1021 for receiving the light beams B, thereby generating corresponding image signals. The control unit 1025 is also disposed on the circuit board 1021 for analyzing the image signals, thereby computing the displacement amount of the detecting arm 101. An example of the control unit 1025 includes but is not limited to a digital signal processor (DSP). The fixing cover 1026 is disposed on the circuit board 1021 for fixing the light source 1022 and the sensor 1024 on the circuit board 1021.

Figure 3:
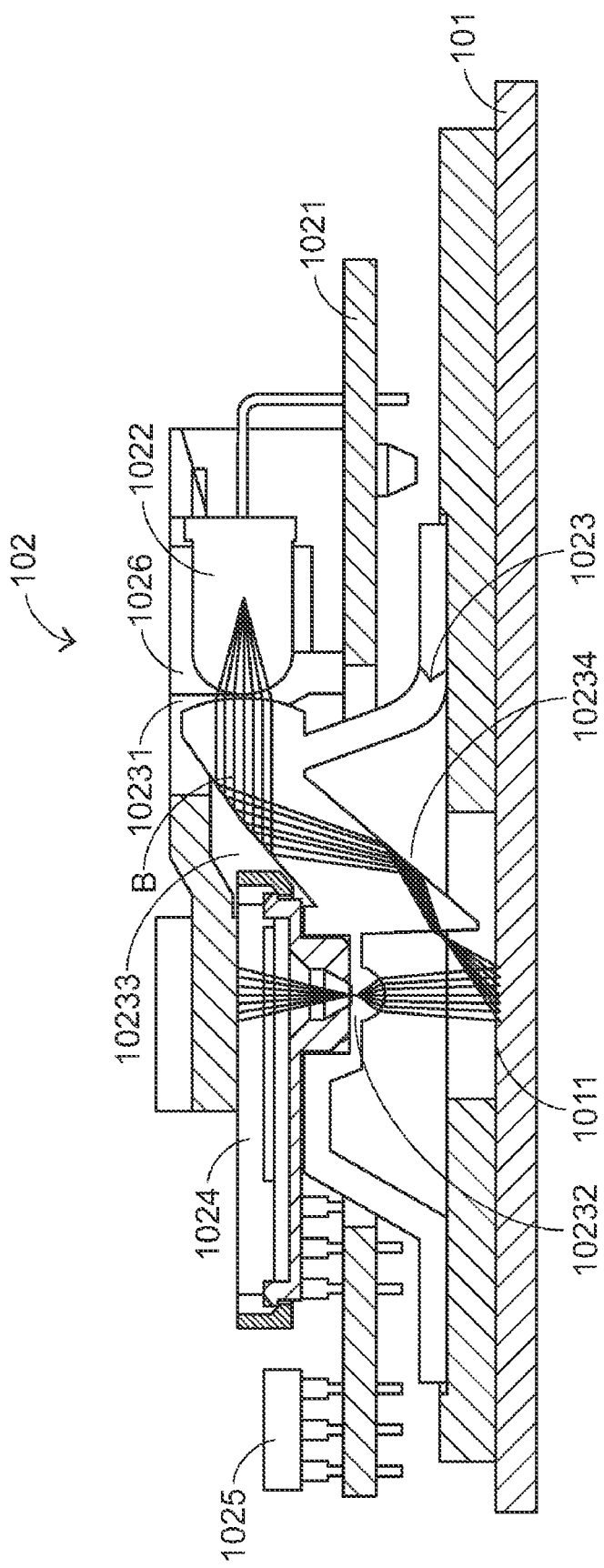
FIG. 3 is a schematic cross-sectional view illustrating the optical displacement sensing module used in the thickness detecting mechanism according to the first embodiment of the present invention.

The detailed configurations of the optical displacement sensing module 102 will be illustrated with reference to FIG. 3. FIG. 3 is a schematic cross-sectional view illustrating the optical displacement sensing module used in the thickness detecting mechanism according to the first embodiment of the present invention. The optical assembly 1023 of the optical displacement sensing module 102 comprises a first optical lens 10231, a second optical lens 10232 and a reflective mirror set. The first optical lens 10231 is arranged in front of the light source 1022. The first optical lens 10231 and the second optical lens 10232 are used for focusing the light beams B. In this embodiment, the first optical lens 10231 and the second optical lens 10232 are convex lenses. The reflective mirror set is used for changing the direction of the light beams B. In this embodiment, the reflective mirror set comprises a first reflective mirror 10233 and a second reflective mirror 10234. It is preferred that the first optical lens 10231, the second optical lens 10232, the first reflective mirror 10233 and the second reflective mirror 10234 of the optical assembly 1023 are integrally formed.

Hereinafter, the operating principles and working conditions of the thickness detecting mechanism 10 will be illustrated with reference to FIG. 1 and FIG. 3. As shown in FIG. 1, the to-be-measured article T has not been introduced into the thickness detecting mechanism 10, and thus the detecting arm 101 is located in the first position P1. Meanwhile, the protrusion 1012 of the detecting arm 101 is disposed and supported on the gliding slot bottom 10311 of the gliding slot 1031. Before the to-be-measured article T is introduced into the thickness detecting mechanism 10, the detecting arm 101 in the first position is detected by the optical displacement sensing module 102, thereby obtaining a reference data. As shown in FIG. 3, the light beams B emitted by the light source 1022 are focused by the first optical lens 10231 while passing through the first optical lens 10231. The focused light beams B are successively reflected from the first reflective mirror 10233 and the second reflective mirror 10234. The reflected light beams B are projected on the surface 1011 of the detecting arm 101. The light beams B reflected from the surface 1011 of the detecting arm 101 are focused by the second optical lens 10232 while passing through the second optical lens 10232. Afterwards, the light beams B reflected from the surface 1011 and focused by the second optical lens 10232 are received by the sensor 1024, thereby generating a first image signal. The first image signal includes the image of the surface 1011 when the detecting arm 101 is located in the first position P1.

Figure 2:
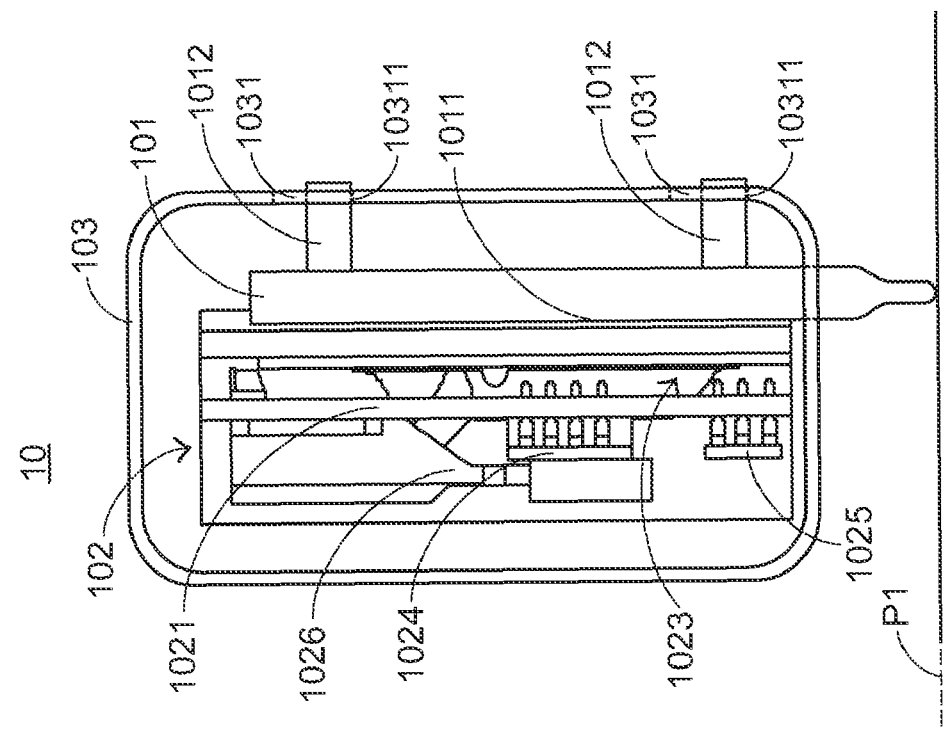
FIG. 2 is a schematic view illustrating a thickness detecting mechanism according to the first embodiment of the present invention, in which the detecting arm is located in a second position.

FIG. 2 is a schematic view illustrating a thickness detecting mechanism according to the first embodiment of the present invention, in which the detecting arm is located in a second position. When the to-be-measured article T is introduced into the thickness detecting mechanism 10, the to-be-measured article T is sustained against the detecting arm 101 such that the detecting arm 101 is moved. In response to movement of the detecting arm 101, the protrusion 1012 of the detecting arm 101 is moved in the gliding slot 1031, and the detecting arm 101 is moved from the first position P1 to a second position P2 (see FIG. 2). As shown in FIG. 2, the displacement amount ΔP between the first position P1 and the second position P2 is substantially equal to the thickness of the to-be-measured article T. In other words, the thickness of the to-be-measured article T is obtained by detecting the displacement amount ΔP of the detecting arm 101.

When the detecting arm 101 is moved to the second position P2, the optical displacement sensing module 102 outputs the light beams B to detect the detecting arm 101 in the second position P2. That is, after the light beams B successively pass through the first optical lens 10231, the light beams B are reflected from the first reflective mirror 10233 and the second reflective mirror 10234 and then projected on the surface 1011 of the detecting arm 101. The light beams B reflected from the surface 1011 of the detecting arm 101 pass through the second optical lens 10232. Afterwards, the light beams B reflected from the surface 1011 and focused by the second optical lens 10232 are received by the sensor 1024, thereby generating a second image signal. The second image signal includes the image of the surface 1011 when the detecting arm 101 is located in the second position P2.

After the first image signal and the second image signal are obtained by the optical displacement sensing module 102, the first image signal and the second image signal are transmitted to the control unit 1025 through the circuit board 1021. By comparing the difference between the first image signal and the second image signal, the control unit 1025 calculates the displacement amount ΔP between the first position P1 and the second position P2, thereby obtaining the thickness of the to-be-measured article T.

After the thickness-detecting operation is completed and the to-be-measured article T is transported across the detecting arm 101, the to-be-measured article T is no longer sustained against the detecting arm 101. Due to the gravity of the detecting arm 101, the detecting arm 101 naturally falls down from the second position P2 to the first position P1 where the detecting arm 101 is not sustained.

Figure 4:
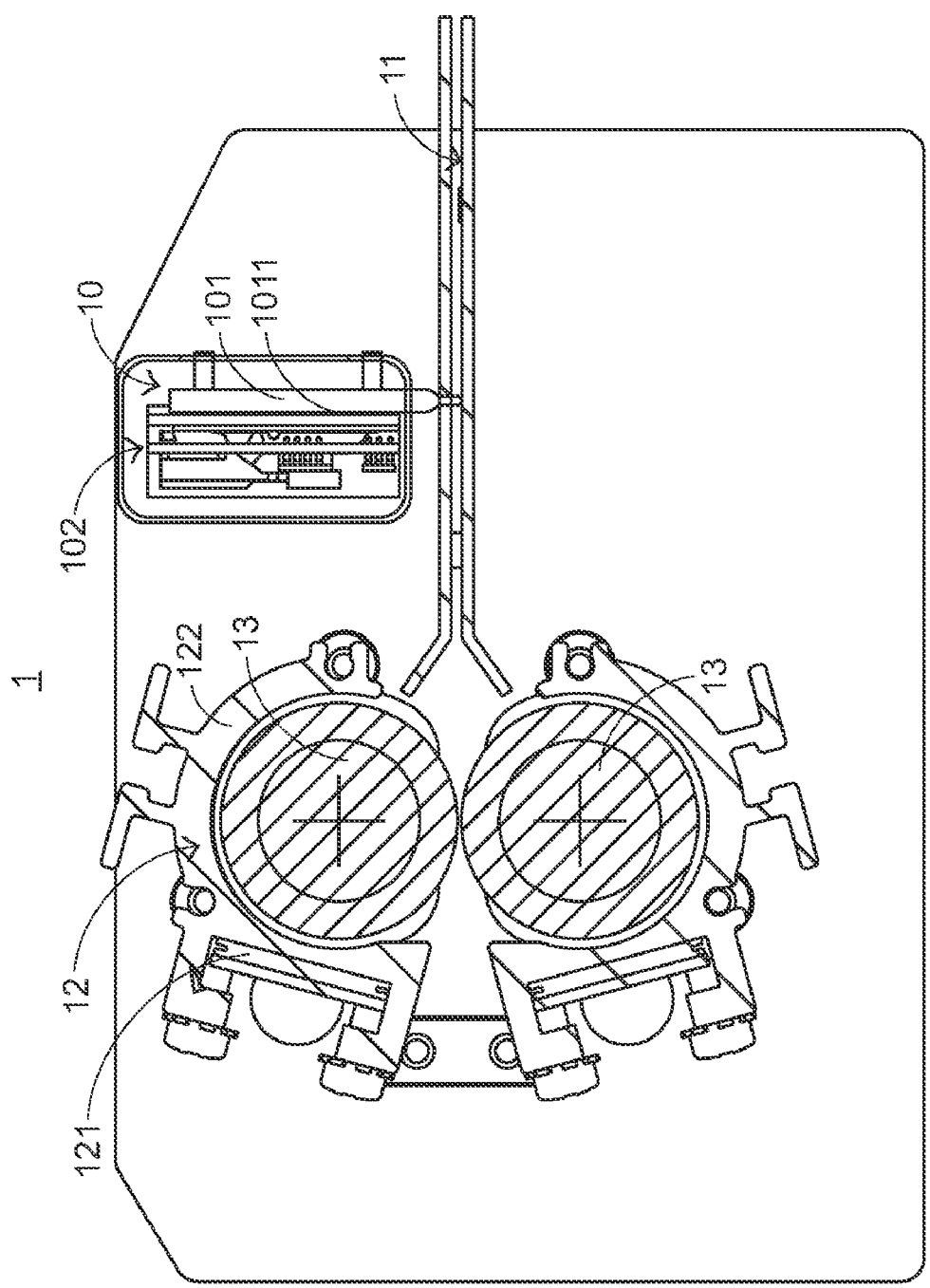
FIG. 4 is a schematic view illustrating a first electronic device having the thickness detecting mechanism according to the first embodiment of the present invention.

The internal structure and the operating principle of the thickness detecting mechanism 10 have been described as above. An application of the thickness detecting mechanism 10 in an electronic device will be illustrated as follows. FIG. 4 is a schematic view illustrating a first electronic device having the thickness detecting mechanism according to the first embodiment of the present invention. In this embodiment, the first electronic device 1 is a sheet laminating apparatus, and the to-be-measured article T is a sheet-like article (not shown). The sheet laminating apparatus 1 comprises a transfer passage 11, a heat-treating member 12, a laminating member 13 and a thickness detecting mechanism 10. The sheet-like article could be transported through the transfer passage 11. The thickness detecting mechanism 10 is disposed beside the transfer passage 11. The structure of the thickness detecting mechanism 10 has been illustrated as above, and is not redundantly described herein. The laminating member 13 is arranged at the distal end of the transfer passage 11 for transmitting and laminating the sheet-like article. The heat-treating member 12 comprises an electrically-heated plate 121 and a heater 122. By the electrically-heated plate 121, electrical energy is converted into heat energy. The heat energy generated by the electrically-heated plate 121 is uniformly distributed over the heater 122, and radiated through an air gap between the heater 122 and the laminating member 13 so as to heat up the laminating member 13. The laminating member 13 transmits the heat energy to the sheet-like article during the sheet-like article passes through the laminating member 13, thereby heating and pressing the sheet-like article.

Figure 6:
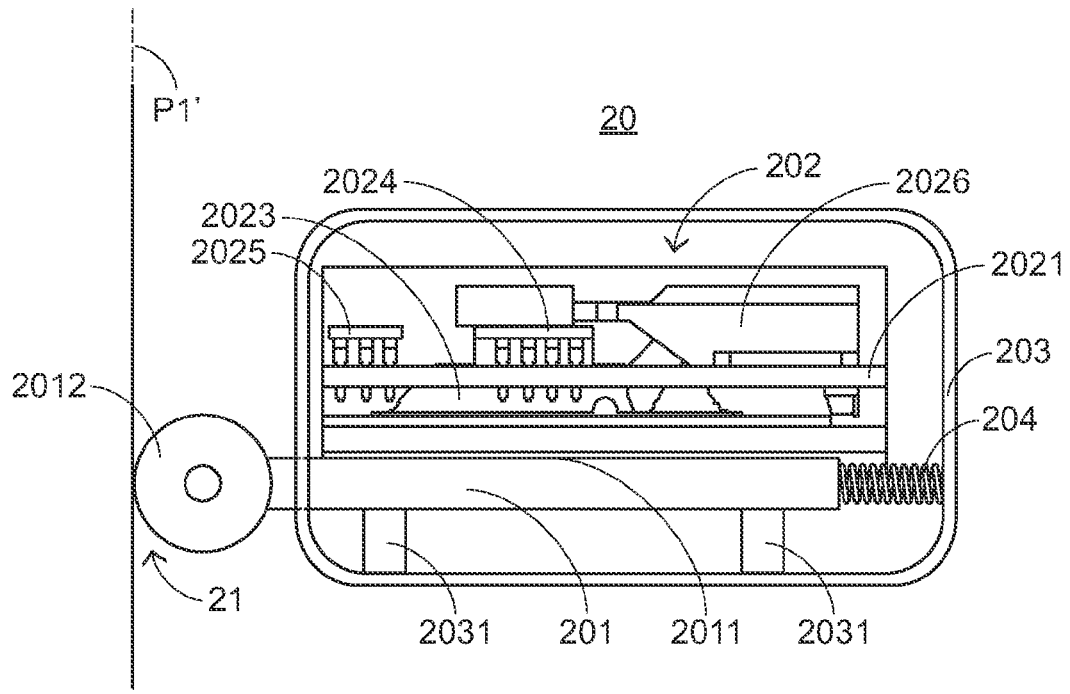
FIG. 6 is a schematic view illustrating the thickness detecting mechanism according to the second embodiment of the present invention.

Before the sheet-like article is introduced into the sheet laminating apparatus 1, the detecting arm 101 is located in the first position P1' (see FIG. 6). By the optical displacement sensing module 102 of the thickness detecting mechanism 10, a first image signal is obtained. When the sheet-like article is introduced into the transfer passage 11 of the sheet laminating apparatus 1, the sheet-like article is sustained against the detecting arm 101 such that the detecting arm 101 is moved from the first position P1' to the second position P2' (see FIG. 7). Similarly, by the optical displacement sensing module 102 of the thickness detecting mechanism 10, a second image signal is obtained. According to the first image signal and the second image signal, the control unit 1025 calculates the displacement amount ΔP' between the first position P1' and the second position P2', thereby obtaining the thickness of the to-be-measured article T. After the thickness of the sheet-like article is detected by the thickness detecting mechanism 10, the temperature of the heat-treating member 12 to be provided to the laminating member 13 and the rotating speed of the laminating member 13 are dynamically adjusted, thereby achieving optimal laminating efficacy. Moreover, the use of the thickness detecting mechanism 10 could discriminate whether the thickness of the sheet-like article is beyond the allowable limit of the sheet laminating apparatus 1. If the thickness of the sheet-like article is beyond the allowable limit of the sheet laminating apparatus 1, the laminating operation needs to be terminated in order to prevent from a jamming problem.

Figure 5:
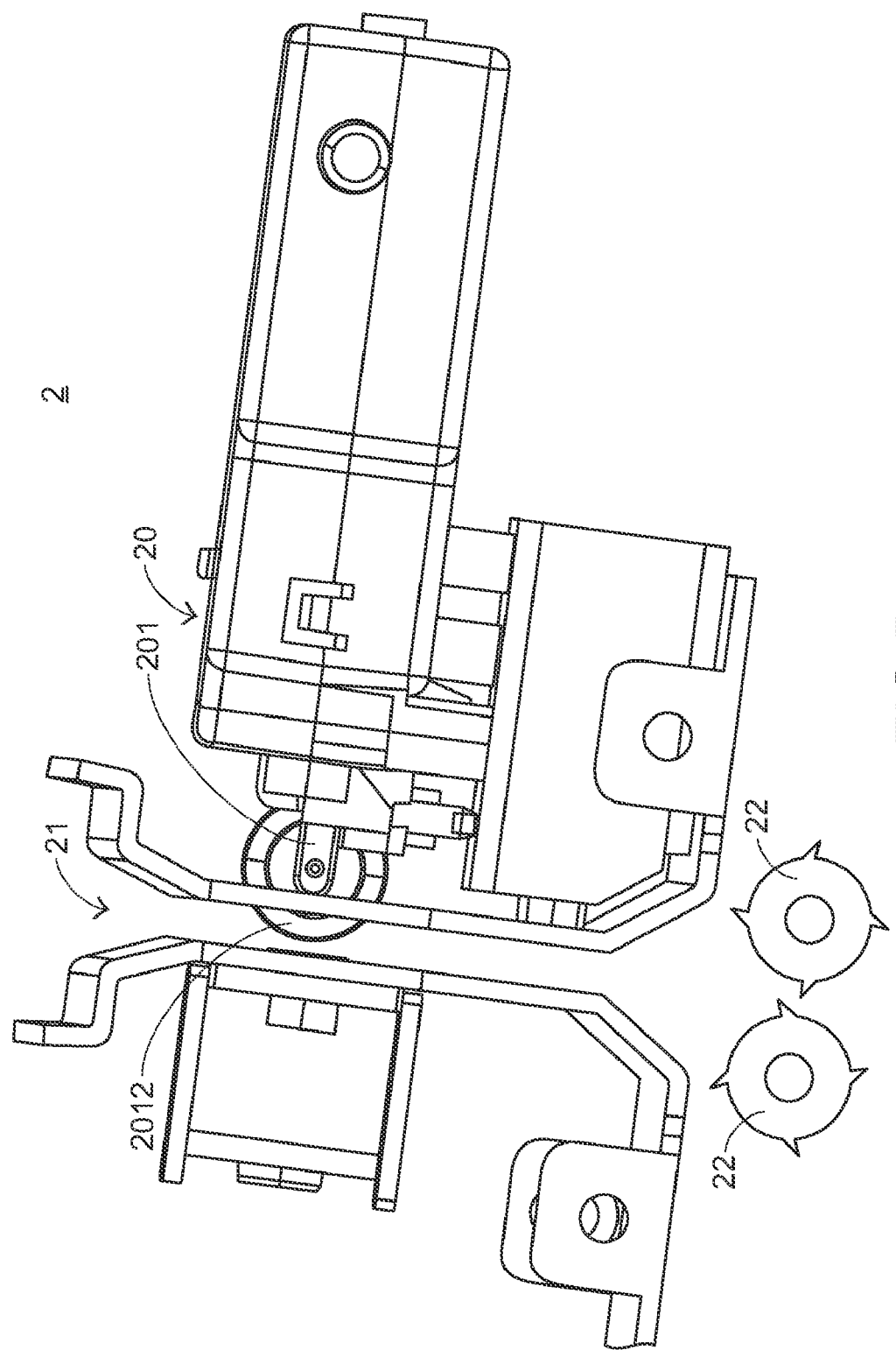
FIG. 5 is a schematic view illustrating a second electronic device having a thickness detecting mechanism according to a second embodiment of the present invention.

The thickness detecting mechanism of the present invention could be applied to another electronic device. FIG. 5 is a schematic view illustrating a second electronic device having a thickness detecting mechanism according to a second embodiment of the present invention. In this embodiment, the second electronic device 2 is a paper shredder, and the to-be-measured article T' is a paper (not shown). As shown in FIG. 5, the paper shredder 2 comprises a shredding path 21, a shredding knife assembly 22 and a thickness detecting mechanism 20. The shredding knife assembly 22 is disposed at the outlet of the shredding path 21 for cutting the paper that is exited from the shredding path 21. The thickness detecting mechanism 20 is disposed beside the shredding path 21 for detecting the paper that is transported through the shredding path 21.

The configurations of the thickness detecting mechanism 20 are somewhat distinguished from those of the thickness detecting mechanism 10. FIG. 6 is a schematic view illustrating the thickness detecting mechanism according to the second embodiment of the present invention. The thickness detecting mechanism 20 is used for detecting a to-be-measured article T' (see FIG. 7). In this embodiment, the thickness detecting mechanism 20 comprises a detecting arm 201, an optical displacement sensing module 202, a case 203 and a spring 204. The case 203 is used for sheltering the components of the thickness detecting mechanism 20. When the to-be-measured article T' is introduced into the thickness detecting mechanism 20, the to-be-measured article T' is sustained against the detecting arm 201 such that the detecting arm 201 is moved. The detecting arm 201 has a surface 2011 and a roller 2012. The surface 2011 is arranged at a side of the detecting arm 201. The roller 2012 is arranged at a distal end of the detecting arm 201. The roller 2012 is contacted with the to-be-measured article T' for facilitating movement of the to-be-measured article T'. The optical displacement sensing module 202 is disposed beside the detecting arm 201 for detecting the displacement amount of the detecting arm 201, thereby acquiring the thickness of the to-be-measured article T'. The case 203 comprises a supporting part 2031. The supporting part 2031 is sustained against another side of the detecting arm 201 in order to prevent from rocking of the detecting arm 201 during the movement of the detecting arm 201. As a consequence, the detecting error of the thickness detecting mechanism 20 is reduced. An end of the spring 204 is connected with the case 203. The other end of the spring 204 is connected with the detecting arm 201. After the to-be-measured article T' is transported across the detecting arm 201, the to-be-measured article T' is no longer sustained against the detecting arm 201. Due to the elastic force of the spring 204, the detecting arm 201 is restored from the second position P2' to the first position P1'. The optical displacement sensing module 202 comprises a circuit board 2021, a light source (not shown), an optical assembly 2023, a sensor 2024, a control unit 2025 and a fixing cover 2026. The light beams generated by the optical displacement sensing module 202 are projected on the surface 2011 of the detecting arm 201, thereby acquiring corresponding image signals. The procedures of acquiring the image signals have been illustrated as above, and are not redundantly described herein. Please refer to FIG. 6 again. Before the to-be-measured article T' is introduced into the thickness detecting mechanism 20, the detecting arm 201 is located in the first position P1' and the spring 204 is in a stretched state. Before the to-be-measured article T' is introduced into the thickness detecting mechanism 20, the optical displacement sensing module 202 detects the detecting arm 201 in the first position P1', thereby acquiring a first image signal.

Figure 7:
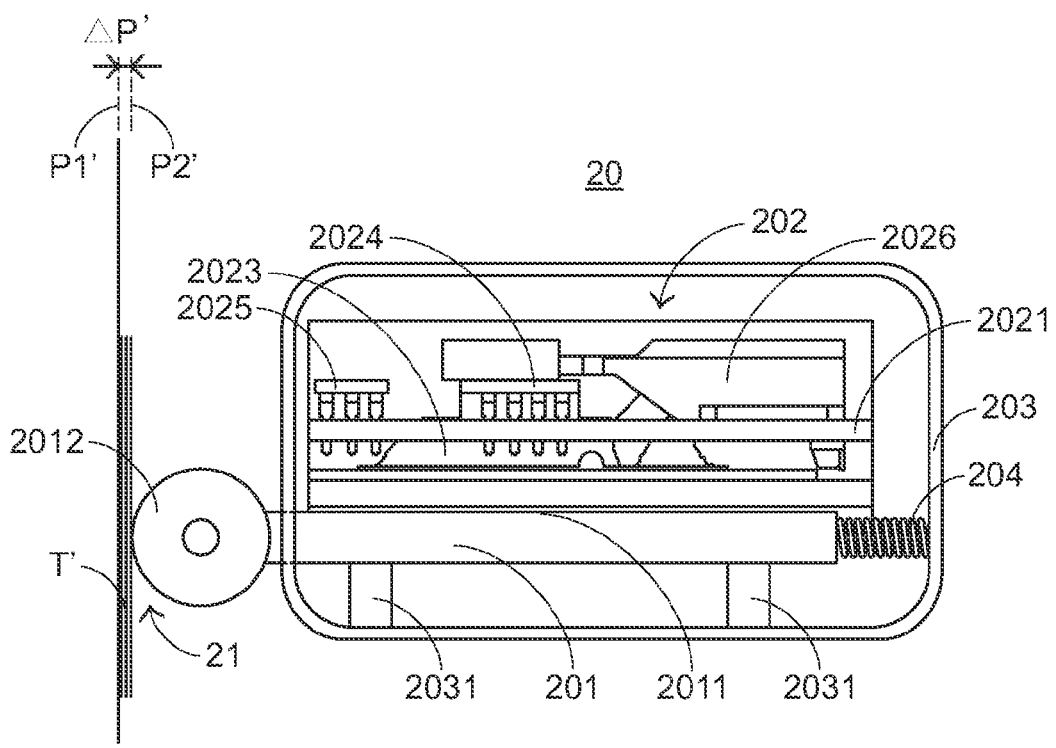
FIG. 7 is a schematic view illustrating the thickness detecting mechanism according to the second embodiment of the present invention, in which the detecting arm is located in a second position.

When the to-be-measured article T' is introduced into the shredding path 21, the to-be-measured article T' is sustained against the detecting arm 201 such that the detecting arm 201 is moved from the first position P1' to the second position P2' (see FIG. 7). At the same time, the spring 204 is compressed by the detecting arm 201 to be in a compressed state. When the detecting arm 201 is moved to the second position P2', the optical displacement sensing module 202 outputs the light beams to detect the detecting arm 201 in the second position P2', thereby acquiring a second image signal. After the first image signal and the second image signal are obtained by the optical displacement sensing module 202, the first image signal and the second image signal are transmitted to the control unit 2025 through the circuit board 2021. According to the first image signal and the second image signal, the control unit 2025 calculates the displacement amount ΔP' between the first position P1' and the second position P2', thereby acquiring the thickness of the to-be-measured article T'.

After the thickness-detecting operation is completed and the to-be-measured article T' is exited from the shredding path 21, the to-be-measured article T' is no longer sustained against the detecting arm 201. At the same time, the spring 204 is restored from the compressed state to the stretched state, so that the detecting arm 201 is returned from the second position P2' to the first position P1' where the detecting arm 201 is not sustained. In some embodiments, a thickness threshold value has been previously stored in the control unit 2025. In a case that the thickness of the to-be-measured article T' is smaller than the thickness threshold value, the to-be-measured article T' is transported by the roller 2012 and moved in the shredding path 21 so as to be cut by the shredding knife assembly 22. Whereas, in a case that the thickness of the to-be-measured article T' is greater than or equal to the thickness threshold value, the roller 2012 is moved in the reverse direction to withdraw the to-be-measured article T' from the shredding path 21, thereby preventing from paper jamming.

Figure 8:
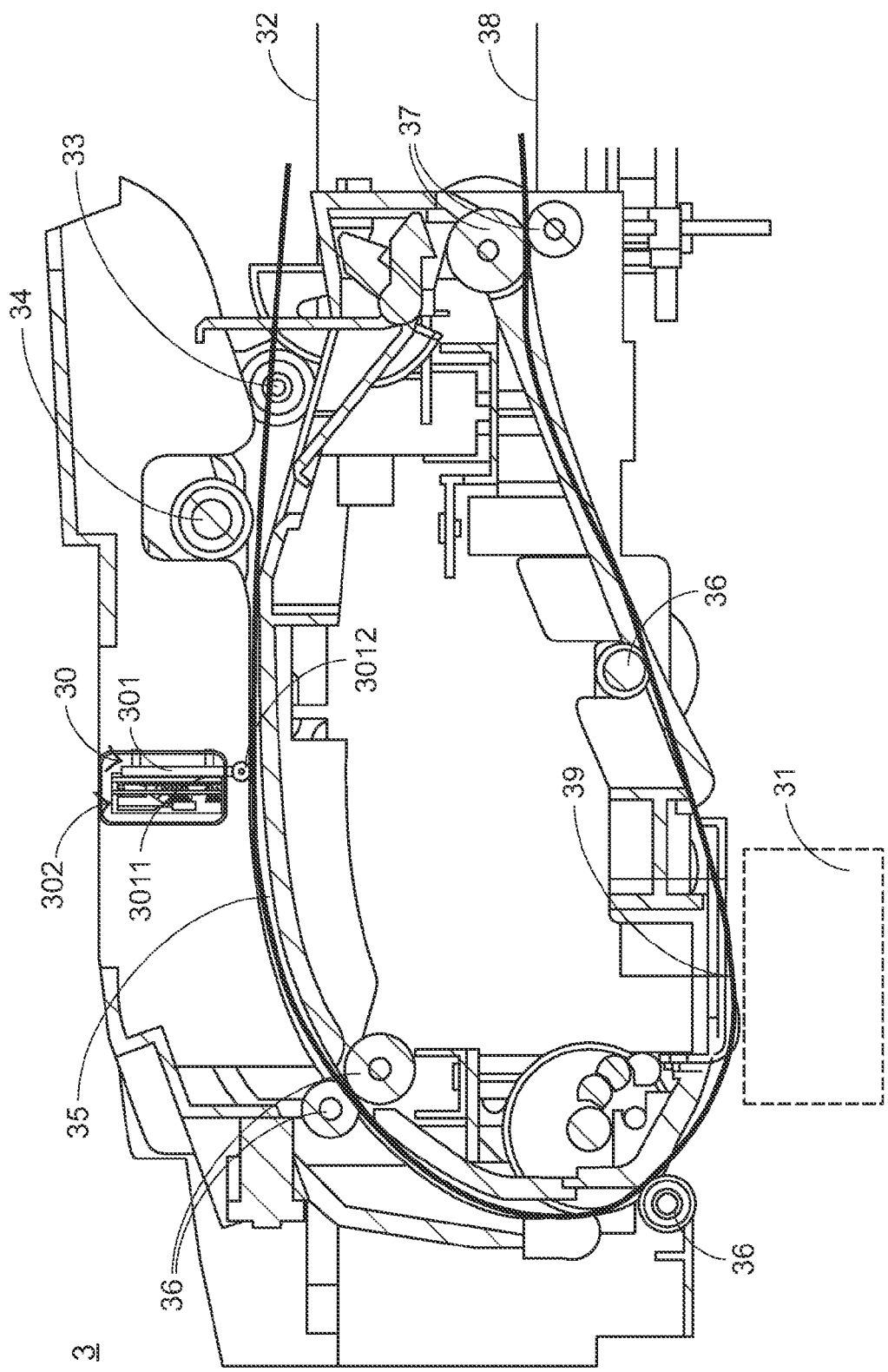
FIG. 8 is a schematic view illustrating a third electronic device having a thickness detecting mechanism according to a third embodiment of the present invention.

The thickness detecting mechanism of the present invention could be applied to another electronic device. FIG. 8 is a schematic view illustrating a third electronic device having a thickness detecting mechanism according to a third embodiment of the present invention. In this embodiment, the third electronic device 3 is a scanning apparatus for scanning a to-be-measured article (not shown), and the to-be-measured article is a paper. The scanning apparatus 3 comprises a thickness detecting mechanism 30, a scanning module 31, a paper input tray 32, a paper pick-up roller 33, a paper separation roller 34, a paper transfer channel 35, multiple transfer rollers 36, a paper ejecting roller 37, a paper ejecting tray 38 and a scanning region 39. The scanning module 31 is used for scanning the image of the paper that is transported across the scanning region 39. The paper input tray 32 is disposed at a side of the scanning module 31 for placing thereon the paper that has not been scanned. The paper ejecting tray 38 is disposed under the paper input tray 32 for placing thereon the paper that has been scanned. The paper transfer channel 35 is arranged between the paper input tray 32 and the paper ejecting tray 38, and the paper could be transported through the paper transfer channel 35. The paper pick-up roller 33 is disposed in the vicinity of the paper input tray 32 for feeding the paper that is placed on the paper input tray 32 into the internal portion of the scanning apparatus 3. The paper separation roller 34 is disposed in the vicinity of the paper pick-up roller 33 for separating the paper to be fed into the scanning apparatus 3, so that only a single paper is allowed to be fed into the paper transfer channel 35 at a time. By the paper ejecting roller 37, the paper is exited to the paper ejecting tray 38. The multiple transfer rollers 36 are arranged in the paper transfer channel 35 for transporting the paper through the paper transfer channel 35. The thickness detecting mechanism 30 is disposed at a side of the paper transfer channel 35 for discriminating whether only a paper is transported through the paper transfer channel 35. In this embodiment, the thickness detecting mechanism 30 comprises a detecting arm 301 and an optical displacement sensing module 302. The detecting arm 301 comprises a surface 3011 and a roller 3012.

For scanning a stack of papers by the scanning apparatus 3, the papers placed on the paper input tray 32 are successively fed into the internal portion of the scanning apparatus 3 by the paper pick-up roller 33 and separated by the paper separation roller 34. When the paper is sustained against the roller 3012 of the thickness detecting mechanism 30, the roller 3012 is moved. According to the displacement amount of the surface 3011 of the detecting arm 301, the optical displacement sensing module 302 measures the thickness of the paper. If the optical displacement sensing module 302 discriminates that only one paper is sustained against the roller 3012, the paper is continuously transported by the transfer rollers 36. After the thickness is detected and the paper is transported to the scanning region 39, the paper is scanned by the scanning module 31. The scanned paper is transported by the transfer rollers 36 and then exited to the paper ejecting tray 38 by the paper ejecting roller 37. Meanwhile, the scanning operation of the paper is finished. Whereas, if the optical displacement sensing module 302 discriminates that more than two papers are sustained against the roller 3012, a so-called double feeding problem occurs. At the same time, the scanning apparatus 3 stops transporting the papers. In other words, the thickness detecting mechanism 30 is capable of discriminating whether double feeding problem occurs, thereby preventing erroneous scanning operations.

The structure and the operating principle of the thickness detecting mechanism of the present invention have been described as above. The thickness detecting mechanism of the present invention integrates an optical displacement sensing module and some other simple mechanical components. In comparison with the conventional thickness detecting mechanism, the thickness detecting mechanism of the present invention is simplified, has reduced number of components, and is cost-effective. Since the assembling cost is reduced to have economic benefits and the overall volume is decreased, the thickness detecting mechanism of the present invention could be applied to many kinds of electronic devices.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A thickness detecting mechanism for detecting a thickness of a to-be-measured article that is introduced into an electronic device, said thickness detecting mechanism comprising:

a detecting arm moved as said to-be-measured article introduced into said electronic device is sustained against said detecting arm, wherein said detecting arm is located in a first position before said to-be-measured article is sustained against said detecting arm, and said detecting arm is located in a second position when said to-be-measured article is sustained against said detecting arm;

an optical displacement sensing module disposed at a side of said detecting arm for detecting a displacement amount of said detecting arm from said first position to said second position, to generate a first image signal corresponding to said detecting arm at said first position and a second image signal corresponding to said detecting arm at said second position, thereby acquiring said thickness of said to-be-measured article by comparing a difference between said first image signal and said second image signal;

a case for sheltering said thickness detecting mechanism, wherein said case further comprises a supporting part, which is sustained against another side of said detecting arm for preventing from rocking of said detecting arm during movement of said detecting arm, wherein said case further comprises a gliding slot, and said gliding slot has a gliding slot bottom;

a spring, wherein an end of said spring is connected with said case, the other end of said spring is connected with said detecting arm, and after said to-be-measured article is transported across said detecting arm and no longer sustained against said detecting arm, an elastic force of said spring is offered to return said detecting arm from said second position to said first position;

wherein said detecting arm further comprises a protrusion disposed at another side of said detecting arm and inserted into said gliding slot, said protrusion is supported on said gliding slot bottom when said detecting arm is located in said first position, and said detecting arm is moved and said protrusion is moved in said gliding slot when said to-be-measured article is introduced into said thickness detecting mechanism and sustained against said detecting arm; and wherein after said to-be-measured article is transported across said detecting arm and no longer sustained against said detecting arm, said detecting arm is returned to said first position, and said protrusion is returned to said gliding slot bottom and supported on said gliding slot bottom.

2. The thickness detecting mechanism according to claim 1 wherein said detecting arm has a surface disposed at said side thereof.

3. The thickness detecting mechanism according to claim 2 wherein said optical displacement sensing module comprises:
- a circuit board;
- a light source disposed on said circuit board for emitting light beams;
- an optical assembly for guiding said light beams to be projected on said surface of said detecting arm;
- a sensor disposed on said circuit board for receiving said light beams reflected from said surface and generating corresponding image signals according to said reflected light beams, wherein a first image signal is obtained by said sensor when said detecting arm is located in said first position, and a second image signal is obtained by said sensor when said detecting arm is located in said second position; and
- a control unit disposed on said circuit board for calculating said displacement amount between said first position and said second position according to said first image signal and said second image signal.

4. The thickness detecting mechanism according to claim 3 wherein said optical displacement sensing module further comprises a fixing cover, which is disposed on said circuit board for fixing said light source and said sensor on said circuit board.

5. The thickness detecting mechanism according to claim 3 wherein said optical assembly comprises:

- a first optical lens arranged in front of said light source for focusing said light beams emitted by said light source and projecting said focused light beams on said surface of said detecting arm; and
- a second optical lens for receiving said light beams reflected from said surface of said detecting arm and focusing said light beams.

6. The thickness detecting mechanism according to claim 5 wherein said optical assembly further comprises a reflective mirror set for changing the direction of said light beams, so that said light beams are projected on said surface of said detecting arm.

7. The thickness detecting mechanism according to claim 6 wherein said reflective minor set comprises a first reflective minor and a second reflective mirror, said light beams emitted by said light source passes through said first optical lens, is reflected from said first reflective minor and said second reflective mirror, and is projected on said surface of said detecting arm, wherein said light beams reflected from said surface of said detecting arm pass through said second optical lens and is projected on said sensor to be received by said sensor.

8. The thickness detecting mechanism according to claim 7 wherein said first optical lens and said second optical lens are convex lenses.

9. The thickness detecting mechanism according to claim 7 wherein said first optical lens, said second optical lens, said first reflective mirror and said second reflective mirror of said optical assembly are integrally formed.

10. The thickness detecting mechanism according to claim 3 wherein said light source is a light emitting diode (LED) or a laser diode.

11. The thickness detecting mechanism according to claim 3 wherein said control unit is a digital signal processor (DSP).

12. The thickness detecting mechanism according to claim 1 wherein said detecting arm further comprises a roller, which is disposed at an end of said detecting arm and contacted with said to-be-measured article for facilitating movement of said to-be-measured article.

13. The thickness detecting mechanism according to claim 1 wherein said electronic device is a paper shredder, and said to-be-measured article is a paper.

14. The thickness detecting mechanism according to claim 1 wherein said electronic device is a sheet laminating apparatus, and said to-be-measured article is a sheet-like article.

15. The thickness detecting mechanism according to claim 1 wherein said electronic device is a scanning apparatus, and said to-be-measured article is a paper.

* * * * *